United States Patent [19]
Shimizu et al.

[11] Patent Number: 5,212,416
[45] Date of Patent: May 18, 1993

[54] PRIMARY COIL ASSEMBLY FOR A SUPERCONDUCTING LINEAR INDUCTION MOTOR

[75] Inventors: Hitoshi Shimizu, Ichihara; Katsuro Oishi; Yasuzo Tanaka, both of Yokohama; Syuiti Sato; Shinnichi Yatabe, both of Kimitsu; Osami Tsukamoto, Yokohama, all of Japan

[73] Assignees: The Furukawa Electric Co., Ltd.; Nippon Steel Corporation, both of Tokyo, Japan

[21] Appl. No.: 790,476

[22] Filed: Nov. 12, 1991

[30] Foreign Application Priority Data

Nov. 29, 1990 [JP] Japan .................................. 2-325296
Nov. 29, 1990 [JP] Japan .................................. 2-325297

[51] Int. Cl.$^5$ ............................................. H02K 41/00
[52] U.S. Cl. ............................................. 310/12; 310/16
[58] Field of Search ............................... 310/12, 16

[56] References Cited

U.S. PATENT DOCUMENTS 4,385,248  5/1983  Laskaris ............................. 310/52
4,575,652  3/1986  Gogue ................................ 310/49 R
5,073,734 12/1991  Combette ........................... 310/65

Primary Examiner—Steven L. Stephan
Assistant Examiner—Judson H. Jones
Attorney, Agent, or Firm—Frishauf, Holtz, Goodman & Woodward

[57] ABSTRACT

A primary coil assembly for a superconducting linear induction motor is provided which is arranged opposite to a secondary conductor for exerting a relative thrust on the secondary conductor when energized. The primary coil assembly comprises a plurality of coil units, each including a nonmagnetic and nonconductive bobbin, an alternating-current superconducting wire wound around the bobbin, and nonmagnetic and nonconductive spacers interposed between adjacent turns of the superconducting wire being adjacent to each other in an outward direction with respect to the axis of the bobbin or adjacent to each other in the width direction of the bobbin, for providing a clearance therebetween. The coil units have substantially identical structure and shape and are spaced at a predetermined distance from each other.

6 Claims, 12 Drawing Sheets

PRIMARY COIL ASSEMBLY FOR A SUPERCONDUCTING LINEAR INDUCTION MOTOR

BACKGROUND OF THE INVENTION

1. Field of the Invention

This invention relates to a primary coil assembly for a superconducting linear induction motor, which is suitably used for tension control or meander control of a steel strip in the manufacture of steel plates, or for controlling the stirring of molten steel in a mold or an unsolidified layer of molten steel in the central portion of uncooled steel castings of a continuous casting machine, or for controlling the amount of molten steel poured into the mold.

2. Description of the Related Art

A primary coil assembly for a superconducting linear induction motor is applied, for example, to a meander control of a steel strip in the manufacture of steel plates, as shown in FIG. 1. A pair of primary coil assemblies 11 of an induction motor are arranged on each side of a traveling rolled or half-rolled strip 10, and the paired motors are positioned above and below the strip 10, respectively, at a predetermined distance therefrom. An alternating current is always supplied to the primary coil assemblies 11, such that when the traveling strip 10 meanders in a direction at right angles to the traveling direction, i.e., in the width direction of the strip, at the location of the primary coil assemblies, a thrust acts on the strip 10 in a direction opposite to the direction of such displacement, to thereby hold the strip 10 in position at all times.

In the primary coil assembly for a superconducting linear induction motor, saddle coils shown in FIGS. 2 to 4 are conventionally used. In the case of a three-phase alternating-current motor, the coil assembly comprises three saddle coils 12, 13 and 14 for U, V and W phases, superposed one upon another, and is positioned at a predetermined distance x from the strip 10 serving as a secondary conductor, as shown in FIG. 4. The phase pattern of currents supplied to the coils of this induction motor is U, −V, W, −U, V, −W.

Each coil is impregnated with epoxy resin and unified, to prevent quenching from occurring due to friction heat produced by an accidental movement of the winding. Further, since a superconducting wire constantly produces heat due to alternating current loss, cooling channels are provided between the windings of the coils for circulating liquid helium therethrough.

As described above, the conventional primary coil assembly for a three-phase superconducting linear induction motor includes three saddle coils stacked one upon another and requires space for the cooling channels, and therefore, these three coils are different in size and in the number of turns, and hence have different impedances. Consequently, the induction motor including the saddle coils is unable to produce a thrust uniformly from the sequentially arranged coils.

Furthermore, since the aforementioned primary coil assembly for an induction motor has the shape of a saddle, it is difficult to wind a superconducting wire with a uniform tensile force applied thereto and increase the tensile force itself. Therefore, although the windings are each impregnated with epoxy resin to be unified, they are liable to be moved, and thus, quenching is likely to occur due to friction heat produced by the movement of the windings. Moreover, in the aforementioned arrangement of stacked saddle coils, the phase pattern of coil currents is limited substantially to U, −V, W, −U, V, −W.

SUMMARY OF THE INVENTION

An object of this invention is to provide a primary coil assembly for a superconducting linear induction motor, which permits an easy adjustment of the impedances of coils and can produce a uniform thrust.

Another object of this invention is to provide a primary coil assembly for a superconducting linear induction motor which has a construction such that quenching due to movement of windings is prevented and the effect of cooling a superconducting wire is improved.

Still another object of this invention is to provide a primary coil assembly for a superconducting linear induction motor which is easily manufactured and suited for modularization, and of which the phase pattern of coil currents can be selected as desired.

According to this invention, there is provided a primary coil assembly for a superconducting linear induction motor, which is arranged opposite to a secondary conductor for exerting a relative thrust on the secondary conductor when energized. The primary coil assembly comprises a plurality of coil units, each including a nonmagnetic and nonconductive bobbin, an alternating-current superconducting wire wound around the bobbin, and nonmagnetic and nonconductive spacer means interposed between adjacent turns of the superconducting wire being adjacent to each other in an outward direction with respect to an axis of the bobbin or adjacent to each other in a width direction of the bobbin, for providing a clearance therebetween. The coil units have substantially identical structure and shape and are spaced at a predetermined distance from each other.

The coil units are arranged along the secondary conductor, with respective end faces thereof positioned parallel to each other or inclined at a predetermined angle relative to each other.

A surface of each coil unit which is opposed to the secondary conductor may be flat or be projected toward the secondary conductor with respect to the axis of the coil unit, in accordance with the shape of the secondary conductor.

For a rodlike elongated secondary conductor, coil units each having an annular shape may be used so that the coil units may be arranged around the outer periphery of the secondary conductor. Further, an end face of the coil units may be formed in the shape of an annular race track, and the coil units may be arranged in an overlapped manner at a predetermined pitch.

The above and other objects, features, and advantages of this invention will become apparent from the ensuing detailed description taken in conjunction with the accompanying drawings.

DETAILED DESCRIPTION OF THE PREFERRED EMBODIMENTS

Figure 1:
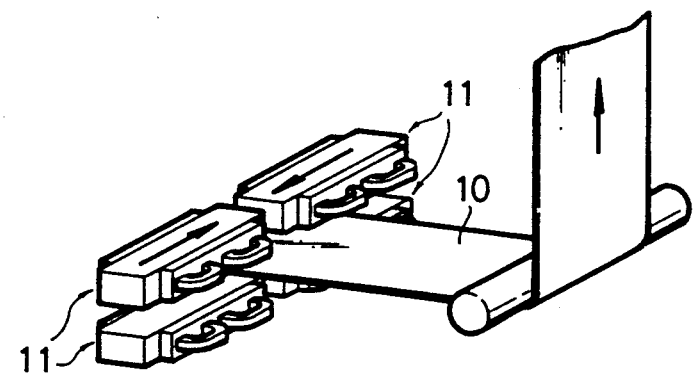
FIG. 1 is a perspective view of a meander control device for controlling the traveling of a steel strip in the manufacture of thin steel plates, to which a primary coil assembly for a superconducting linear induction motor is applied.
Figure 2:
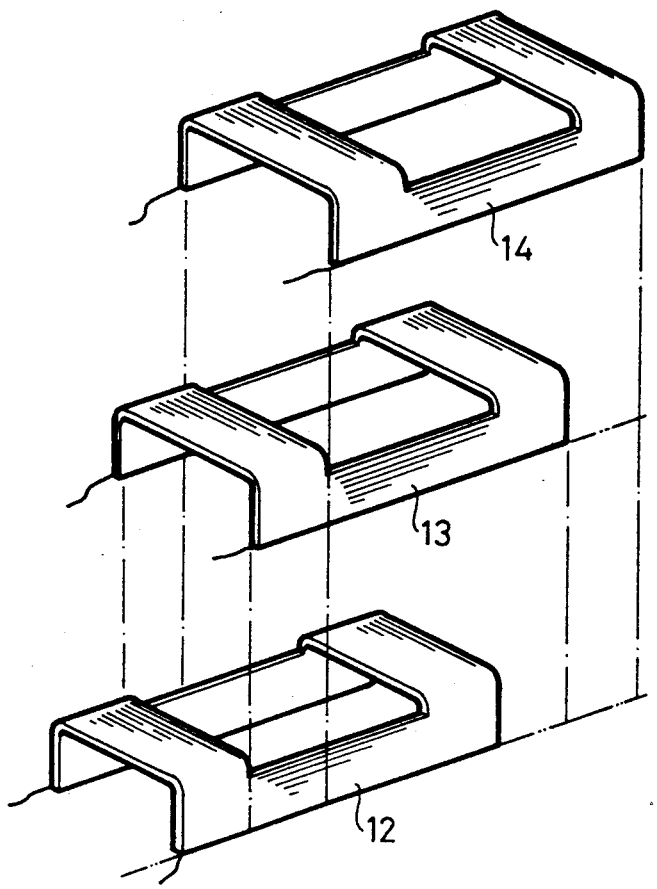
FIG. 2 is an exploded perspective view of a conventional saddle-type primary coil assembly.
Figure 3:
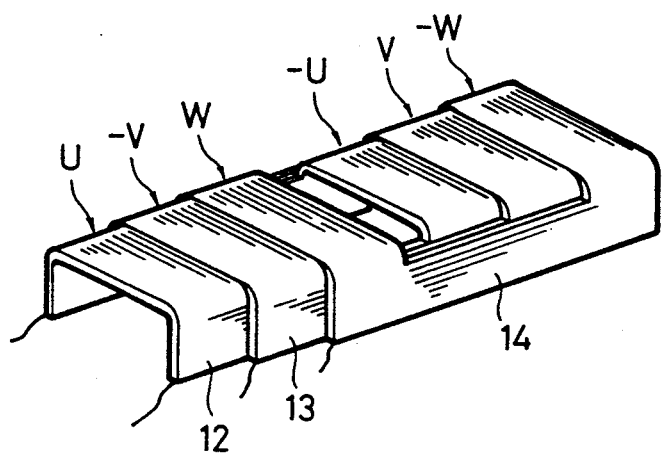
FIG. 3 is a perspective view of an assembly constituted by the three coils shown in FIG. 2.
Figure 4:
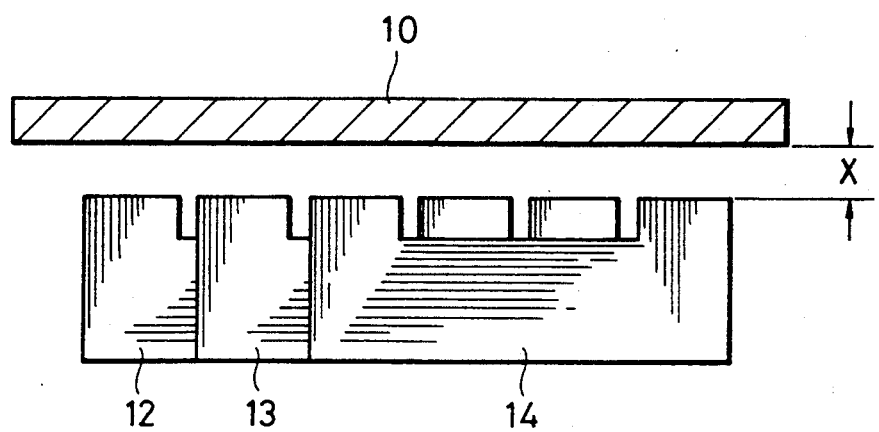
FIG. 4 is a side view illustrating the positional relationship between the conventional saddle-type primary coil assembly and a strip serving as a secondary conductor.

FIGS. 5 through 9 show a primary coil assembly for a superconducting linear induction motor according to a first embodiment of this invention. The primary coil assembly 20 comprises six coil units 21 having identical structure and shape and arranged equidistantly along an axis AX. Each unit 21 is generally D-shaped as viewed from the side thereof, and comprises a bobbin 22, a large number of comb-shaped spacers 23, and an alternating-current superconducting wire 24.

Figure 5:
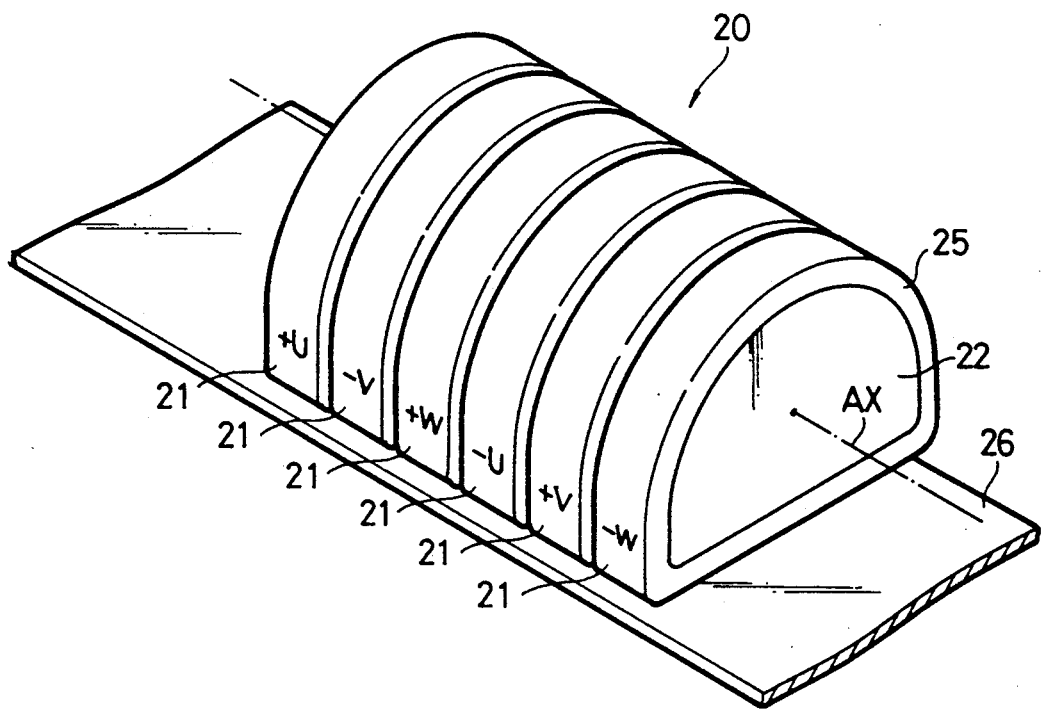
FIG. 5 is a perspective view of a primary coil assembly for a superconducting linear induction motor according to a first embodiment of this invention.
Figure 6:
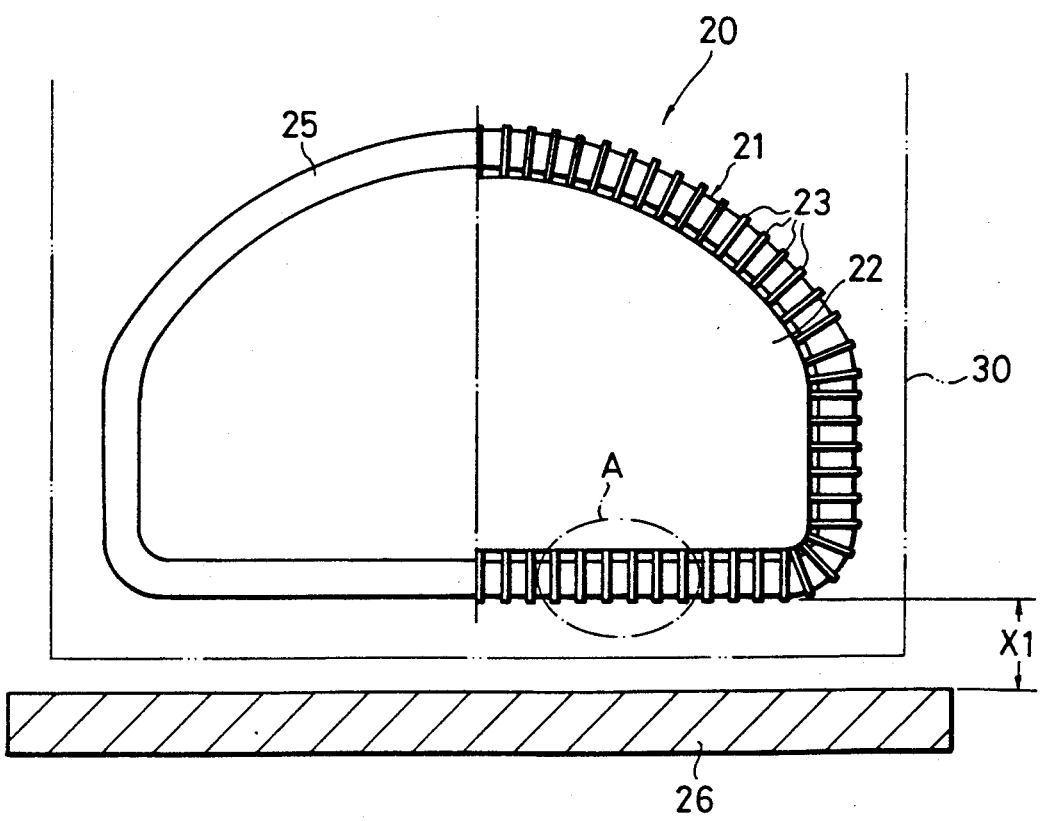
FIG. 6 is a front view of the primary coil assembly shown in FIG. 5.
Figure 7:
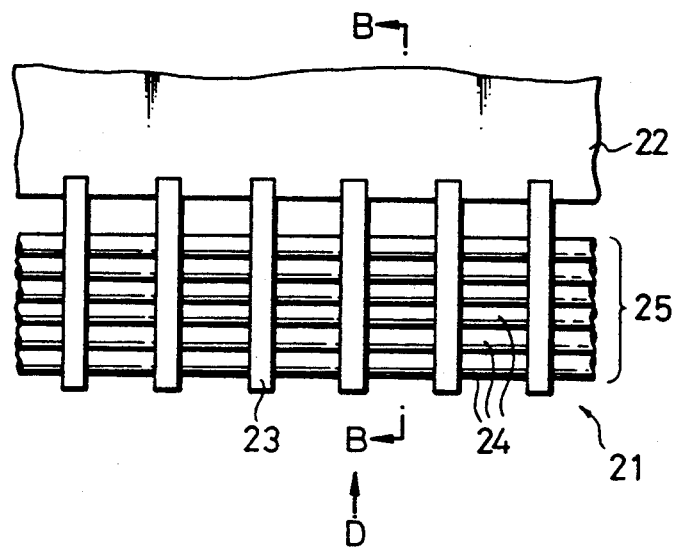
FIG. 7 is an enlarged view of part A indicated in FIG. 6.
Figure 8:
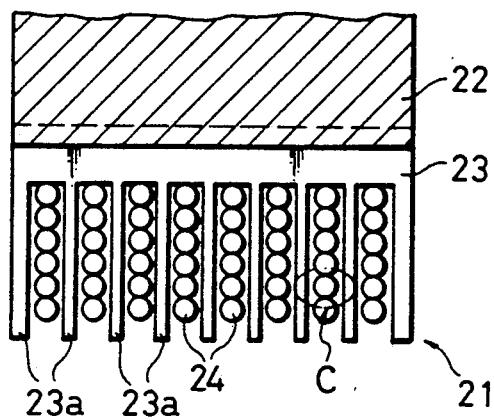
FIG. 8 is a sectional view taken along line B—B in FIG. 7.
Figure 9:
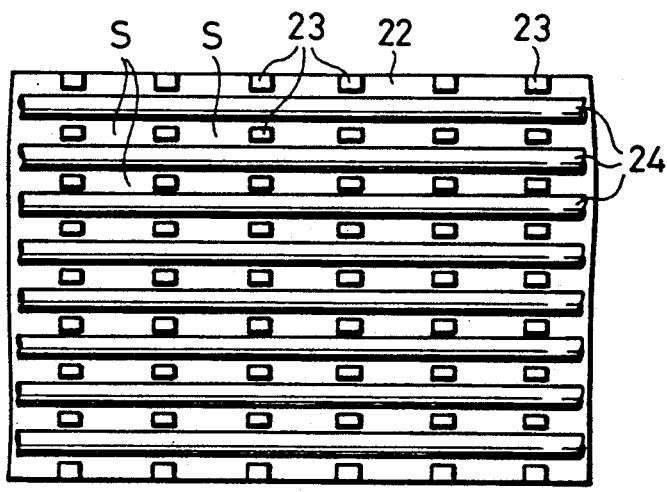
FIG. 9 is a view taken in the direction of arrow D in FIG. 7.

As shown in FIGS. 5 and 6, the bobbin 22 has a D-shape as viewed from the side thereof, and a large number of comb-shaped spacers 23, shown in FIGS. 7 to 9, are arranged at substantially equal intervals on the outer periphery of the bobbin 22. The spacers 23 each have a large number of teeth 23a, and the superconducting wire 24 is wound orderly in the individual spaces between the teeth 23a from the bottoms of the spacers 23 to form a multiple layer, thereby constituting a coil 25.

Winding the superconducting wire 24 in this way enables the adjacent turns of the wire 24 in the width direction of the bobbin to be set apart from each other by a distance S (see FIG. 9) corresponding to the width of each tooth 23a of the spacer 23, and this clearance S serves as a channel for conducting liquid helium for cooling.

The bobbin 22 has a flat surface which is opposed to a secondary conductor 26 and, when viewed as a whole, projects in an outward direction with respect to the axis AX thereof (see FIG. 5). Therefore, when winding the superconducting wire 24 around the bobbin 22, the wire 24 can be coiled with a required tensile force applied thereto while the bobbin 22 is rotated, and thus, the superconducting wire 24 wound around the bobbin 22 does not become loose.

Figure 10:
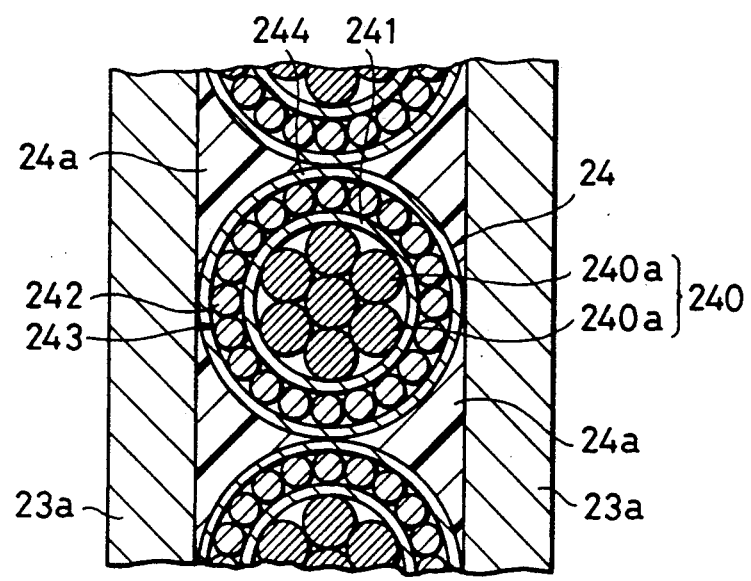
FIG. 10 is an enlarged view of part C indicated in FIG. 8.

As shown in FIG. 10, the alternating-current superconducting wire 24 comprises a core 240 formed by stranding seven stainless steel wires 240a, a braided insulating layer 241 formed by braiding polyester fibers, glass fibers, or the like and disposed around the outer periphery of the core 240, a superconducting wire layer 243 formed of a single twisting of a large number of superconducting wires 242 and disposed around the outer periphery of the braided insulating layer 241, and a braided insulating coating layer 244 formed by braiding polyester fibers, glass fibers, or the like around the outer periphery of the superconducting wire layer 243. The bobbin 22 and the spacers 23 are each produced by forming a nonmagnetic and nonconductive material, such as a GFRP (glass fiber-reinforced plastic).

After the superconducting wire 24 is wound around the bobbin 22, each end of the superconducting wire 24 is fixed and then the wire 24 and the bobbin 22 are dipped into a solution of epoxy resin, whereby epoxy resin fills the spaces between the superconducting wire 24 and the teeth 23a of the spacers 23 and the interior of the superconducting wire 24 (the spaces between the stainless steel wires and the superconducting wires, and the interior spaces of the braided insulating layers) are impregnated with epoxy resin. Thereafter, the bobbin 22 is drawn up from the solution of epoxy resin, and the epoxy resin impregnated into the braided coating layers is set. Hence, not only the adjacent turns of the superconducting wire 24 in the individual grooves of the spacers 23 but also the superconducting wire 24 and the teeth 23a are unified, whereby the alternating-current superconducting wire 24 is firmly attached to the bobbin 22. Nevertheless, the clearances S (FIG. 9) defined between the turns of the superconducting wire 24 by the spacers 23 remain even after the impregnated epoxy resin is set, and thus, the channels for a refrigerant (liquid helium) are maintained.

Six coil units 21, each having the aforementioned structure, are disposed with the axes AX thereof aligned and at a predetermined distance from each other such that the opposed end faces thereof at right angles to the axes AX are parallel to each other, to thereby form the coil assembly 20. The coil assembly 20 is housed in a cryostat 30 (see FIG. 6) containing liquid helium as the refrigerant, and the ends of the superconducting wire 24 of each coil unit 21 are connected to respective electrodes (not shown) of the cryostat 30. The coil assembly according to this invention is composed of a plurality of coil units, and accordingly, the phase pattern of coil currents can be selected as desired by suitably changing the connections between the coil units and the electrodes. In the example shown in FIG. 5, the phase pattern of coil currents is U, −V, W, −U, V, −W. The table below shows an example of phase patterns of primary coil shows an example of phase patterns of primary coil currents available to a primary coil assembly composed of twelve coils.

TABLE

| Pattern No. | Primary Coil's Current Patterns — Current in each primary coil | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | U | −W | V | −U | W | −V | U | −W | V | −U | W | −V |
| 2 | U | U | −W | −W | V | V | −U | −U | W | W | −V | −V |
| 3 | U | V | W | U | V | W | U | V | W | U | V | W |
| 4 | U | U | V | V | W | W | U | U | V | V | W | W |
| 5 | U | U | U | U | V | V | V | V | W | W | W | W |

If the primary coil assembly 20 is arranged in such a manner that the straight sides of the D-shaped coil units 21 are opposed to the secondary conductor 26 at a predetermined distance x1 therefrom, then a superconducting linear induction motor is obtained.

In the first embodiment, the dimensions of each coil unit 21 are set as follows, for example: In each comb-shaped spacer 23, the tooth width is 1 mm, the groove width is 1.5 mm, and the tooth thickness is 4 mm. The outer diameter of the superconducting wire 24 is 1.45 mm. The coil 25 has a section of 64 mm wide and 19.5 mm thick in the direction of depth or superposition. Each coil unit 21 has a straight side of 444 mm and a maximum height of 269.5 mm in the direction at right angles to the straight side. The distance between the adjacent units 21 is 10 mm, and x1 between the coil assembly 20 and the secondary conductor 26 is 60 mm. When a stainless steel plate of 1 mm thick is used as the secondary conductor and a current of 155 A (root-mean-square value) is passed through the superconducting wire 24 at 50 Hz, the induction motor can exert a thrust of approximately 10 kgf on the stainless steel plate 26.

Figure 11:
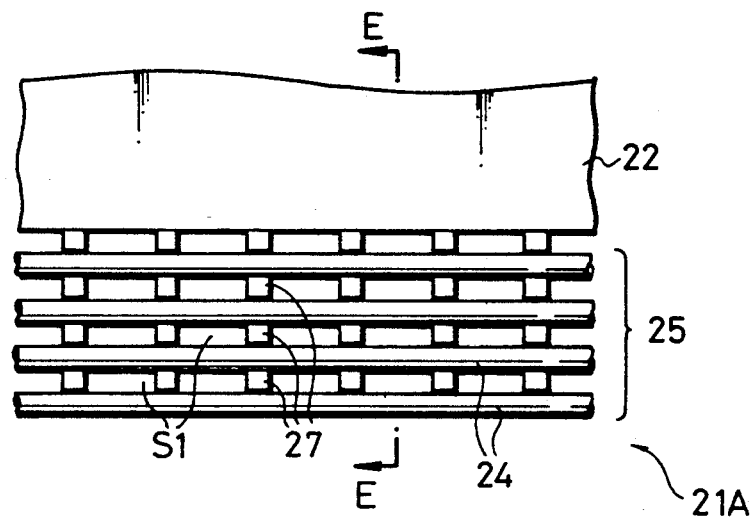
FIG. 11 is a side view of a principal part of a coil unit according to a second embodiment of this invention.
Figure 12:
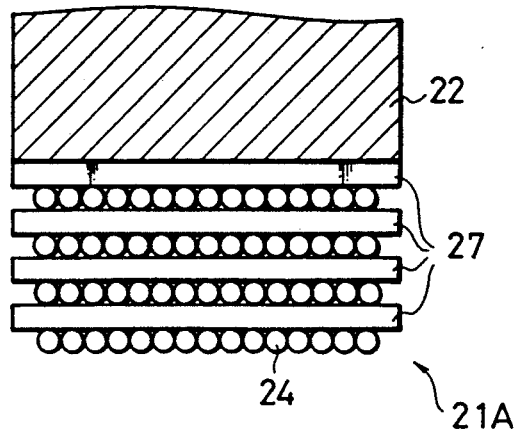
FIG. 12 is a sectional view taken along line E—E in FIG. 11.

In the first embodiment, the clearance S is defined between adjacent turns of the superconducting wire 24 in the width direction of the coil unit 21, but it may be provided between adjacent turns of the wire 24 in the direction of superposition. FIGS. 11 and 12 show a principal part of a coil unit 21A according to a second embodiment of this invention. When the superconducting wire 24 is wound around the bobbin 22 which is identical with that shown in FIG. 5, rodlike, nonmagnetic and nonconductive spacers 27 are interposed between the superposed turns, whereby clearances S1 are defined between the wire layers and serve as channels for the refrigerant.

Figure 13:
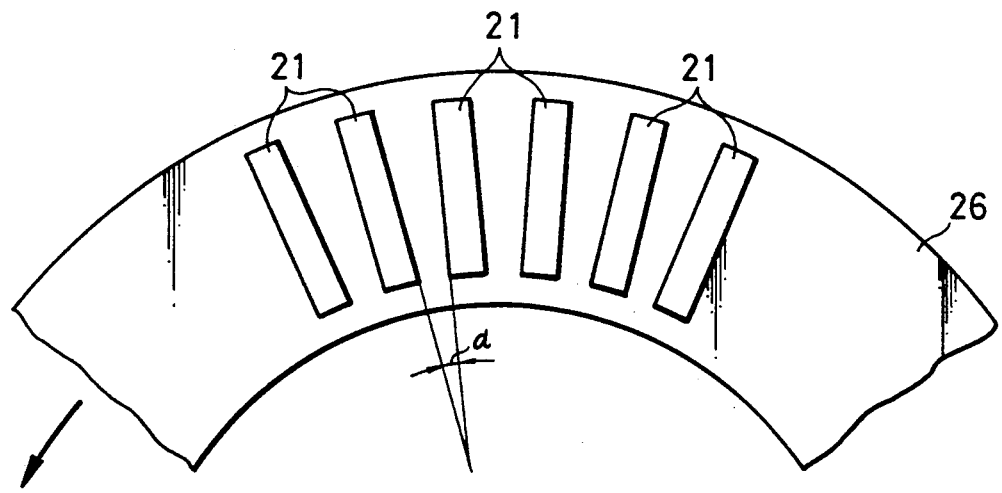
FIG. 13 is a top view illustrating an example of arrangement of the coil units.
Figure 14:
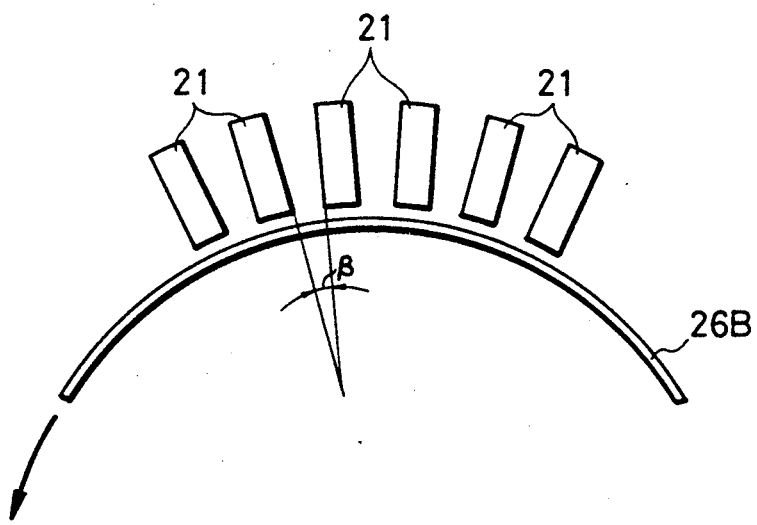
FIG. 14 is a side view illustrating another example of arrangement of the coil units.

Although in the first embodiment shown in FIG. 5, the six coil units 21 are arranged with the axes AX thereof aligned such that the opposed end faces thereof at right angles to the axes AX are parallel to each other, these end faces of the units 21 may be inclined at a predetermined angle relative to each other. FIG. 13 illustrates an arrangement of the coil units 21 of a primary coil assembly in which the coil units are opposed to a secondary conductor 26A having a platelike and annular shape. The units 21 are disposed in such a manner that the opposed end faces thereof are inclined at an angle α relative to each other. FIG. 14 shows an arrangement of the coil units 21 of a primary coil assembly in which the coil units are opposed to a strip 26B as the secondary conductor which travels in a curved line. In this case, the units 21 are disposed in such a manner that the opposed end faces thereof are inclined at an angle β relative to each other. The coil units 21 shown in FIGS. 13 and 14 are identical in structure and shape with those in the first embodiment, and therefore, the same reference numeral is used. Further, in these figures, the arrows indicate the traveling directions of the secondary conductors 26A and 26B, respectively.

Figure 15:
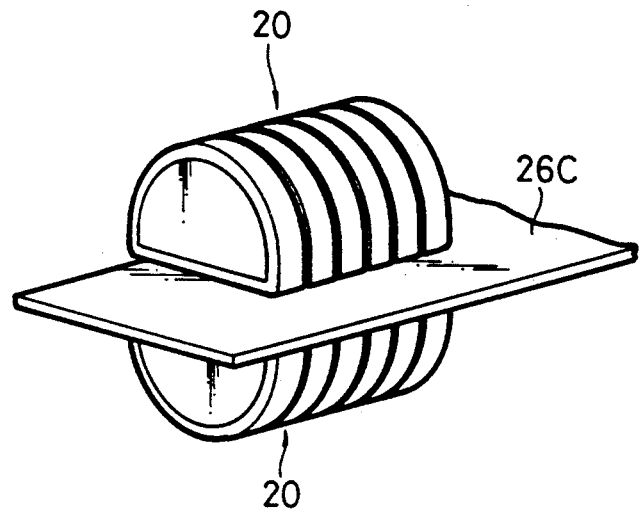
FIG. 15 is a perspective view illustrating an example of how the primary coil assembly for a superconducting linear induction motor according to this invention is used.
Figure 16:
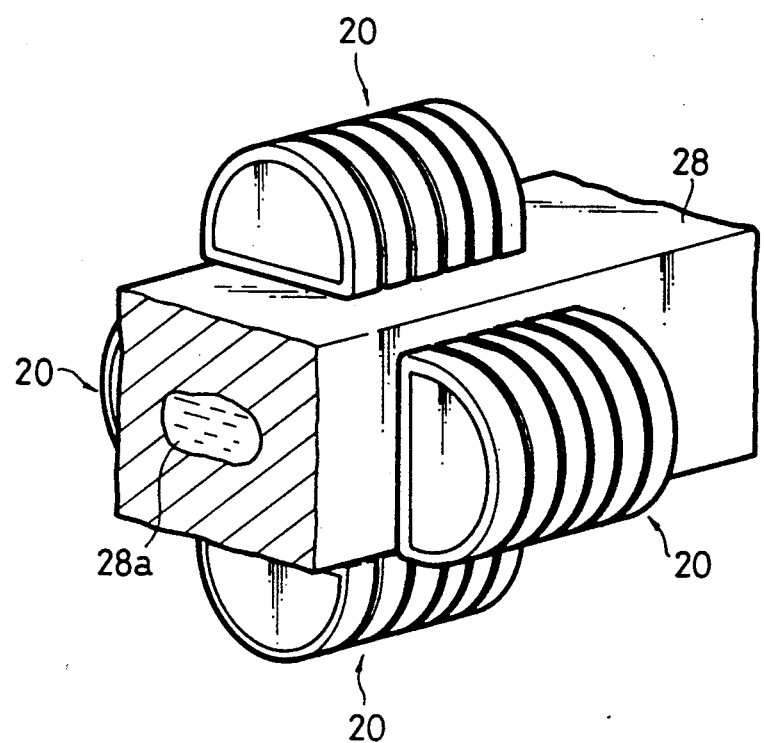
FIG. 16 is a perspective view illustrating another example of application of the primary coil assembly for a superconducting linear induction motor according to this invention.

FIGS. 15 and 16 each illustrate an example of how the primary coil assembly 20 for a superconducting linear induction motor according to the first embodiment is used. FIG. 15 shows a linear induction motor including a pair of assemblies 20 which are arranged symmetrically on both sides, respectively, of a strip 26C serving as the secondary conductor. Theoretically, this arrangement can provide a thrust two times that obtained by a single primary coil assembly opposed to the secondary conductor 26C. FIG. 16 shows four primary coil assemblies 20 opposed to outer surfaces of a cast metal 28 having a rectangular section, which is founded by a continuous casting machine and is in the process of cooling. In this case, the induction motor serves to stir an unsolidified layer 28a of molten metal in the central portion of the cast metal, and thus, segregation is prevented.

Figure 17:
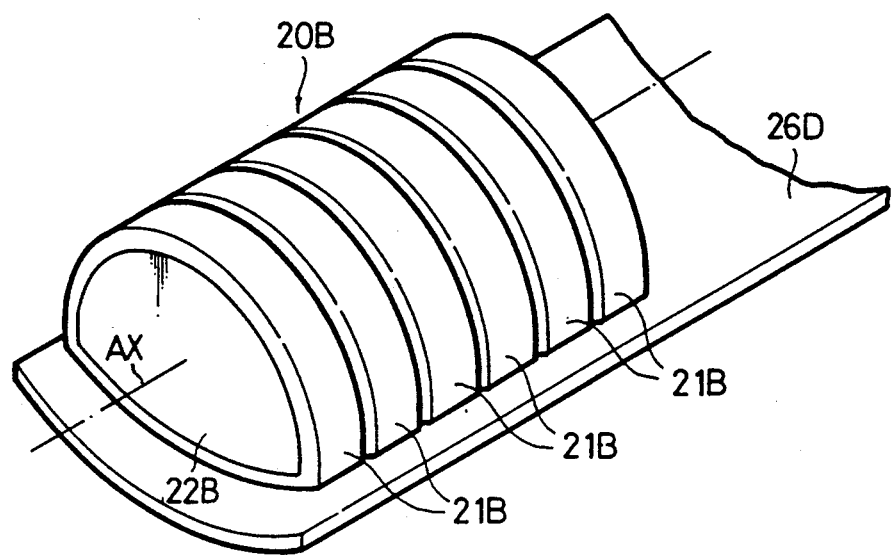
FIG. 17 is a perspective view of a primary coil assembly according to a third embodiment of this invention.

FIG. 17 shows a primary coil assembly according to a third embodiment of this invention. In this primary coil assembly 20B, each coil unit 21B is swollen at an end face thereof outwardly with respect to the axis AX, in accordance with the shape of a secondary conductor 26D curved in the width direction thereof. More specifically, that surface of each coil unit 21B which is opposed to the secondary conductor 26D is formed such that the distance between this surface and the secondary conductor 26D is constant. Like the coil units 21 of the first embodiment, spacers are attached to the bobbin 22B of each coil unit 21B, and the superconducting wire is wound in such a way that a clearance is defined between adjacent turns thereof.

According to the coil unit 21B of the third embodiment in which the outer periphery of the bobbin protrudes outward with respect to the axis AX, the superconducting wire can be coiled with a required tensile force applied thereto while the bobbin is rotated, and hence, the superconducting wire wound around the bobbin is in no way slack.

Figure 18:
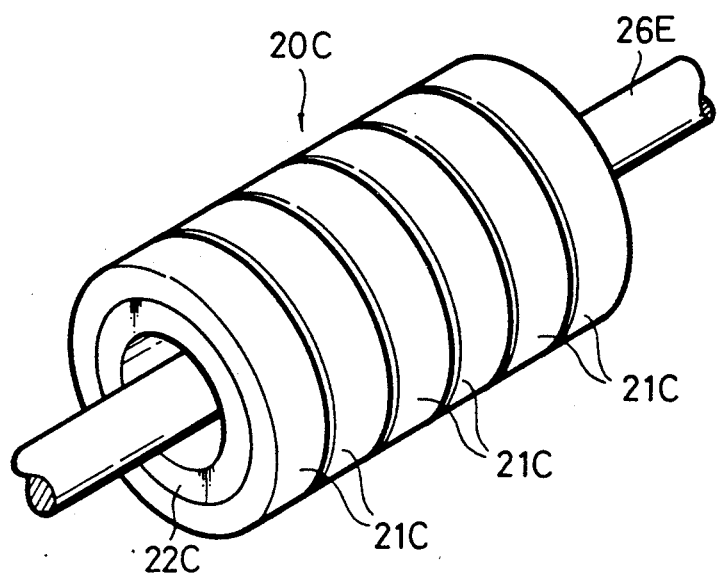
FIG. 18 is a perspective view of a primary coil assembly according to a fourth embodiment of this invention.
Figure 19:
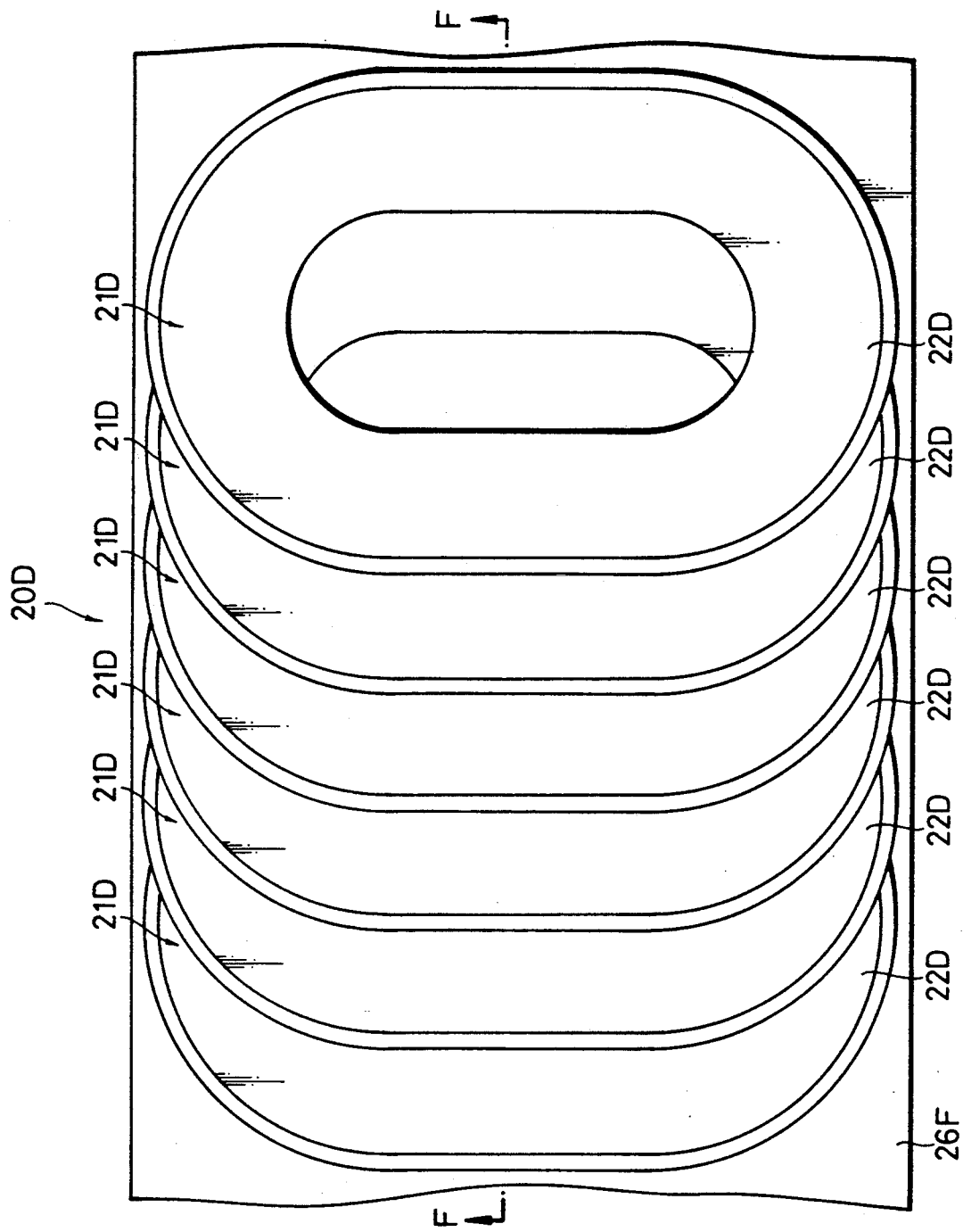
FIG. 19 is a plan view of a primary coil assembly according to a fifth embodiment of this invention.
Figure 20:
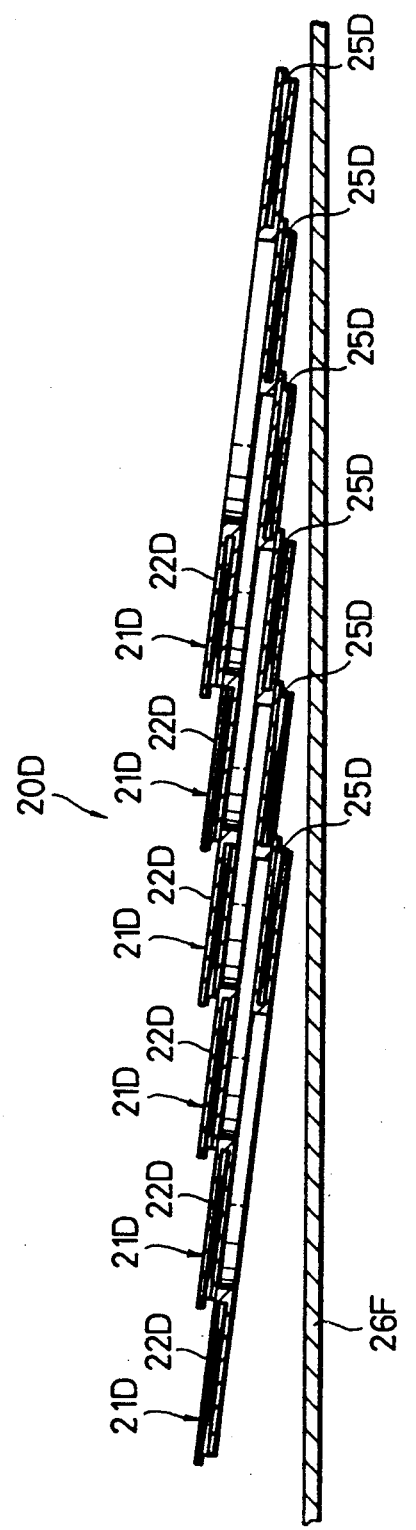
FIG. 20 is a sectional view taken along line F—F in FIG. 19.
Figure 21:
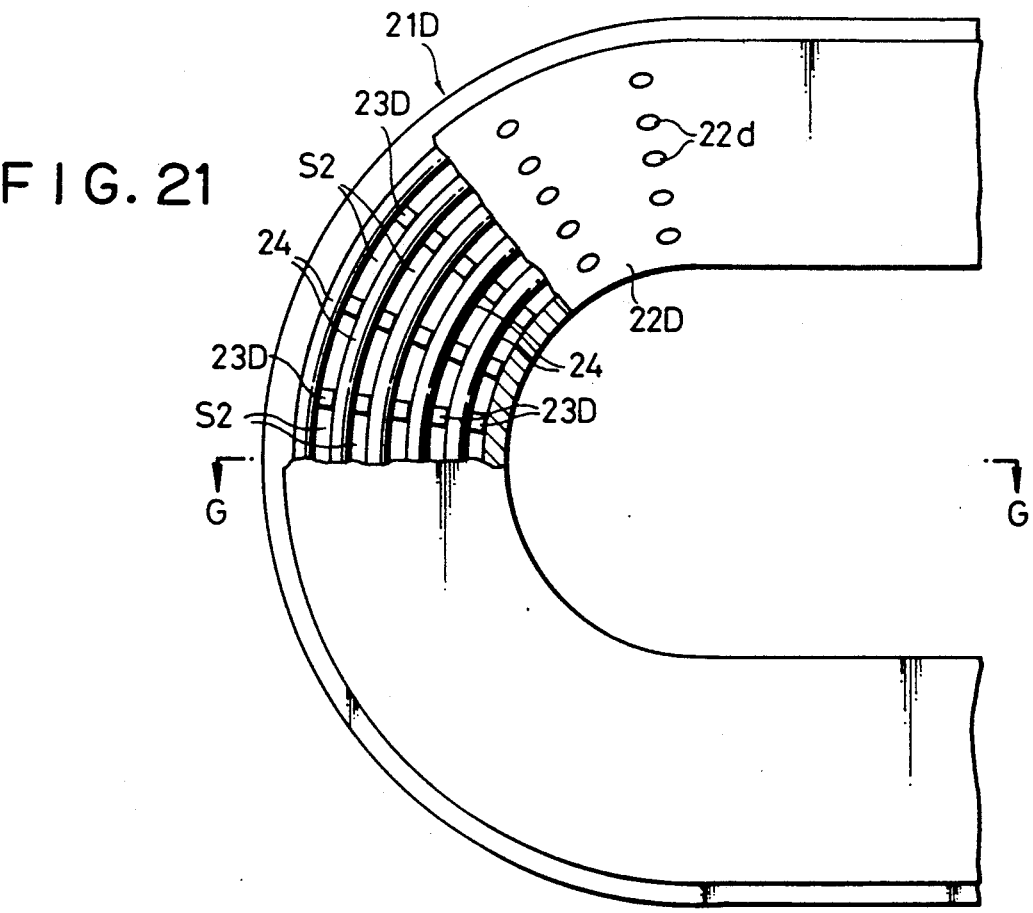
FIG. 21 is a partly broken plan view of a part of the coil unit shown in FIG. 19.

FIG. 18 shows a primary coil assembly according to a fourth embodiment of this invention. This primary coil assembly 20C is suited for use with a rodlike elongated secondary conductor 26E having a circular section, and is arranged around the outer periphery of the secondary conductor 26E. A bobbin 22C of each coil unit 21C of the primary coil assembly 20C has a ring-like shape. Like the coil units 21 of the first embodiment, spacers are attached to the bobbin 22C of each coil unit 21C, and the superconducting wire is wound in such a way that a clearance is defined between adjacent turns thereof. The elongate secondary conductor may have an elliptical section, rectangular section, or the like, in which case both of the coil units and the bobbins thereof are shaped in accordance with the section of the secondary conductor.

The primary coil assembly is positioned such that the axis of each coil unit is parallel to the direction of a relative thrust exerted on the secondary conductor by the primary coil assembly during energization. For example, in the case of the arrangement shown in FIG. 15, the secondary conductor 26C receives a relative thrust from the primary coil assembly 20 in the direction indicated by the arrow.

Figure 22:
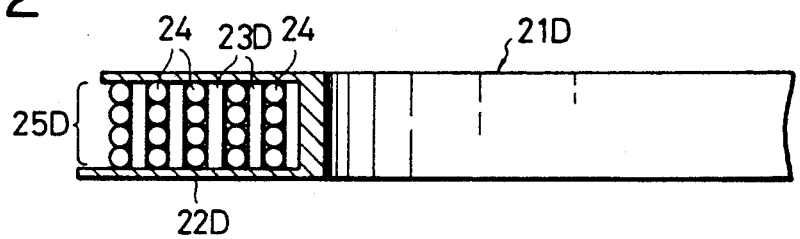
FIG. 22 is a sectional view taken along line G—G in FIG. 21.

FIGS. 19 to 22 illustrate a primary coil assembly according to a fifth embodiment of this invention. This primary coil assembly 20D comprises six flat coil units 21D of annular race track shape which are overlapped and sequentially shifted at a constant pitch. A bobbin 22D of each coil unit 21D has an annular race track shape comprising arcuate portions and straight portions, as viewed from above, and has a U-shaped section with flanges and a web projected, as shown in FIG. 22. The superconducting wire 24 mentioned earlier is orderly wound so as to form wire layers, with rodlike spacers 23D interposed between the layers, whereby a coil 25D is formed. Thus, clearances S2 (see FIG. 21) corresponding to the thickness of the spacers 23D are defined between the layers of the superconducting wire 24. The bobbin 22D and the spacers 23D are each produced by forming a nonmagnetic and nonconductive material, such as a GFRP (glass fiber-reinforced plastic). A large number of small holes 22d are bored through the bobbin 22D for introducing a refrigerant, e.g., liquid helium, into the clearances S2.

When the superconducting wire 24 is wound around the bobbin 22D, a suitable tensile force is applied to the wire 24 while the bobbin 22D is rotated. After the superconducting wire 24 is wound around the bobbin 22D, each end of the wire 24 is fixed and then the wire 24 and the bobbin 22D are dipped into a solution of epoxy resin, whereby epoxy resin enters the clearances S2 through the small holes 22d and fills the spaces between the superconducting wire 24 and the spacers 23D, and the braided coating layers of the wire 24 are impregnated with epoxy resin. Thereafter, the wire 24 and the bobbin 22D are drawn up from the solution of epoxy resin, and the epoxy resin impregnated into the braided coating layers is set. Hence, not only the adjacent turns of each layer of the superconducting wire 24 but also the wire 24 and the spacers 23D are unified, whereby the alternating-current superconducting wire 24 is firmly attached to the bobbin 22D. Nevertheless, the clearances S2 (FIG. 21) defined between the layers of the superconducting wire 24 remain even after the impregnated epoxy resin is set, and thus, the channels for the refrigerant (liquid helium) are maintained.

Six coil units 21D, each having the above-described structure, are arranged at a predetermined pitch and inclined at a predetermined angle to a secondary conductor 26F, with end faces thereof set parallel to each other, such that average distances thereof from the secondary conductor 26F are the same, whereby the coil assembly 20D is obtained. The coil assembly 20D is housed in a cryostat containing liquid helium as the refrigerant, and the ends of the superconducting wire 24 of each coil unit 21D are connected to respective electrodes of the cryostat.

In the fifth embodiment, the dimensions of each coil unit 21D are set, for example, as follows: The thickness of the flange of each spacer 23D is 1 mm. The section of the coil 25D is 7.5 mm wide and 132 mm thick in the direction of depth or superposition. Each coil unit 21D has a major axis of 600 mm and a minor axis of 548 mm, and a tilt angle thereof is 6.7°.

In the fifth embodiment, the superconducting wire 24 is wound with the spacers 23D interposed between the layers thereof. Alternatively, comb-shaped spacers may be used, as in the first embodiment, such that a clearance is defined between adjacent turns of the superconducting wire in the thickness direction of the coil unit.

Figure 23:
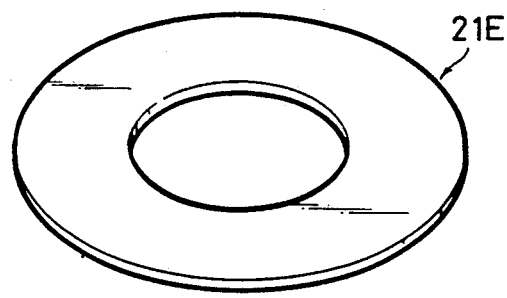
FIG. 23 is a plan view illustrating a modification of an annular race track-type bobbin.

Furthermore, instead of the annular race track-shaped bobbin 22D of the fifth embodiment, an annular oval bobbin 21E having no straight portions, as shown in FIG. 23, may be used.

What is claimed is:

1. A primary coil assembly for a superconducting linear induction motor, comprising:

a plurality of coil units having substantially identical structure and shape and spaced at a predetermined distance from each other, each of the coil units including a nonmagnetic and nonconductive bobbin, an alternating-current superconducting wire wound around the bobbin, and nonmagnetic and nonconductive spacer means interposed between adjacent turns of the superconducting wire being adjacent to each other in an outward direction with respect to an axis of the bobbin or adjacent to each other in a width direction of the bobbin, for providing a clearance therebetween;

wherein the coil units each have an end face and are arranged with the respective end faces thereof inclined at a predetermined angle relative to each other.

2. A primary coil assembly according to claim 1, which is arranged opposite to a secondary conductor for exerting a relative thrust on the secondary conductor when energized.

3. A primary coil assembly according to claim 2, wherein the coil units are each arranged at a predetermined distance from the secondary conductor such that an axis of each coil unit is parallel to the direction of the relative thrust exerted on the secondary conductor by the primary coil assembly during energization.

4. A primary coil assembly according to claim 3, wherein the coil units are arranged in accordance with the shape of the secondary conductor.

5. A primary coil assembly for a superconducting linear induction motor, comprising:

a plurality of coil units having substantially identical structure and shape and spaced at a predetermined distance from each other, each of the coil units including a nonmagnetic and nonconductive bobbin, an alternating-current superconducting wire wound around the bobbin, and nonmagnetic and nonconductive spacer means interposed between adjacent turns of the superconducting wire being adjacent to each other in an outward direction with respect to an axis of the bobbin or adjacent to each other in a width direction of the bobbin, for providing a clearance therebetween;

the primary coil assembly being arranged opposite to a secondary conductor for exerting a relative thrust on the secondary conductor when energized; and wherein the coil units each have a D-shaped end face and a surface opposed to the secondary conductor, said surface being flat in accordance with a shape of the secondary conductor.

6. A primary coil assembly for a superconducting linear induction motor, comprising:

a plurality of coil units having substantially identical structure and shape and spaced at a predetermined distance from each other, each of the coil units including a nonmagnetic and nonconductive bobbin, an alternating-current superconducting wire wound around the bobbin, and nonmagnetic and nonconductive spacer means interposed between adjacent turns of the superconducting wire being adjacent to each other in an outward direction with respect to an axis of the bobbin or adjacent to each other in a width direction of the bobbin, for providing a clearance therebetween;

wherein the coil units each have an annular race track-shaped end face, and being arranged in an overlapped manner at a predetermined pitch.

* * * * *